(12) United States Patent
Kutkut et al.

(10) Patent No.: US 10,923,947 B2
(45) Date of Patent: Feb. 16, 2021

(54) DIRECT CURRENT UNINTERRUPTIBLE POWER SUPPLY WITH CLOUD SERVER AND RELATED METHODS

(71) Applicant: SMART CHARGING TECHNOLOGIES, LLC, Orlando, FL (US)

(72) Inventors: Nasser Kutkut, Orlando, FL (US); Thikrallah Shreah, Oviedo, FL (US)

(73) Assignee: SMART CHARGING TECHNOLOGIES LLC, Orlando, FL (US)

( * ) Notice: Subject to any disclaimer, the term of this patent is extended or adjusted under 35 U.S.C. 154(b) by 0 days.

(21) Appl. No.: 16/884,334

(22) Filed: May 27, 2020

(65) Prior Publication Data
US 2020/0295593 A1 Sep. 17, 2020

Related U.S. Application Data

(63) Continuation-in-part of application No. 15/944,010, filed on Apr. 3, 2018.

(60) Provisional application No. 62/480,679, filed on Apr. 3, 2017.

(51) Int. Cl.
*H02J 1/00* (2006.01)
*H02J 9/06* (2006.01)

(52) U.S. Cl.
CPC .................. *H02J 9/061* (2013.01)

(58) Field of Classification Search
CPC .................................................... H02J 9/061
See application file for complete search history.

(56) References Cited

U.S. PATENT DOCUMENTS

| | | | |
|---|---|---|---|
| 5,057,990 | A | 10/1991 | Gulczynski |
| 5,126,585 | A | 6/1992 | Boys |
| 5,198,698 | A | 3/1993 | Paul et al. |
| 5,465,011 | A | 11/1995 | Miller et al. |
| 5,781,422 | A | 7/1998 | Lavin et al. |
| 5,978,236 | A | 11/1999 | Faberman et al. |
| 6,330,176 | B1 | 12/2001 | Thrap et al. |
| 6,753,622 | B2 | 6/2004 | Oughton, Jr. |

(Continued)

OTHER PUBLICATIONS

U.S. Appl. No. 12/942,733, filed Apr. 8, 2015.
(Continued)

*Primary Examiner* — Jared Fureman
*Assistant Examiner* — Esayas G Yeshaw
(74) *Attorney, Agent, or Firm* — Allen, Dyer, Doppelt + Gilchrist, PA

(57) ABSTRACT

A UPS system may include a DC UPS having first DC outputs coupled to a first switch and configured to provide a battery DC power signal or a first DC power signal to corresponding first loads, first load controllers each coupled between respective ones of the first DC outputs and the first switch, and a controller coupled to the first switch and a second switch, and the first load controllers. The controller may be configured to switch between a first mode where the first DC power signal is supplied to the first load controllers, and a second mode where the battery DC power signal is supplied to the first load controllers. The UPS system may include a cloud application server in communication with the DC UPS and configured to cause the controller to disable and enable the first load controllers.

20 Claims, 5 Drawing Sheets

(56) References Cited

U.S. PATENT DOCUMENTS

| | | | |
|---|---|---|---|
| 9,712,073 B2* | 7/2017 | Fernandez | H02M 7/04 |
| 2014/0062206 A1* | 3/2014 | Bryson | H02J 3/385 |
| | | | 307/80 |
| 2014/0368042 A1 | 12/2014 | Giuntini et al. | |
| 2015/0012144 A1* | 1/2015 | Wang | H02J 3/386 |
| | | | 700/291 |
| 2015/0180232 A1* | 6/2015 | Mino | H02J 7/345 |
| | | | 307/23 |
| 2016/0294204 A1* | 10/2016 | Deokar | H02M 3/33561 |

OTHER PUBLICATIONS

U.S. Appl. No. 15/067,283, filed Mar. 11, 2016.
U.S. Appl. No. 15/922,127, filed Mar. 15, 2018.
U.S. Appl. No. 15/939,862, filed Mar. 29, 2018.
U.S. Appl. No. 15/952,358, filed Apr. 13, 2018.
U.S. Appl. No. 15/952,900, filed Apr. 13, 2018.

* cited by examiner

DIRECT CURRENT UNINTERRUPTIBLE POWER SUPPLY WITH CLOUD SERVER AND RELATED METHODS

RELATED APPLICATION

This application is a continuation-in-part of copending application Ser. No. 15/944,010, filed Apr. 3, 2018, which claimed priority to Application No. 62/480,679, filed Apr. 3, 2017, the entire subject matter of these applications is incorporated herein by reference in its entirety.

TECHNICAL FIELD

The present disclosure relates to the field of power systems, and, more particularly, to backup power systems for electronic devices and related methods.

BACKGROUND

Uninterruptible power supplies (UPS) have been used in many environments to provide backup power when utility power fails to allow critical equipment to shut down gracefully and/or keep critical required loads operational until a backup generator comes online. UPS systems have also been used to condition incoming power to reduce voltage sags and protect against voltage surges that may damage sensitive electronic equipment. Most UPS systems in use today are alternating current (AC) in nature (i.e. they are connected to the AC power systems and provide AC output power to the connected loads).

There are three typical types of UPS systems. Referring to FIG. 1A, there are standby UPS systems, which allow information technology (IT) equipment to run off utility power until the UPS detects a problem, at which point it switches to battery power. This system includes a filtering circuit 101, a transfer switch 105 coupled downstream from the filtering circuit, and a sequence of a charger 102, a battery 103, and an inverter 104 coupled in parallel to the filter circuit.

Referring to FIG. 1B, there are line-interactive UPS systems, where the direct current (DC)-to-AC power inverter 204 is always connected to the output of the UPS. This system operates the inverter 204 in reverse during times when the input AC power is normal, providing battery charging. This system also includes a transfer switch 205, and a battery 203 coupled to the inverter 204.

Referring to FIG. 1C, there are double conversion online UPS systems, which are similar to the standby UPS, except that the primary power path is the inverter 304 instead of the AC main. This system also includes a transfer switch 305 coupled to the AC main, a charger 302 and a battery 303 coupled upstream of the inverter 304.

UPS systems are typically available in single phase or three phase configurations, where three phase configurations allow greater power to be delivered to a single point or load. Single-phase UPSs are a more economical option for smaller applications with low kVA requirements, which are typically seen in home, small business, and remote or satellite offices. In these applications, the computing power is less than 20 kVA. UPS systems can be connected in parallel to provide more backup power.

SUMMARY

Generally speaking, a UPS system may include a DC UPS. The DC UPS may include a battery power source configured to provide a battery DC power signal, an AC-DC converter configured to convert a grid AC power signal to a first DC power signal, and a first switch coupled downstream from the AC-DC converter. The DC UPS may also include a second switch coupled between the first switch and the battery power source, and a plurality of first DC outputs coupled to the first switch and configured to provide the battery DC power signal or the first DC power signal to a corresponding plurality of first loads. The DC UPS may include a plurality of first load controllers, each coupled between respective ones of the plurality of first DC outputs and the first switch, and a controller coupled to the first and second switches, and the plurality of first load controllers. The controller may be configured to switch between a first mode where the first DC power signal is supplied to the plurality of first load controllers, and a second mode where the battery DC power signal is supplied to the plurality of first load controllers. The UPS system may include a cloud application server in communication with the DC UPS and configured to cause the controller to disable and enable the plurality of first load controllers.

The cloud application server may be configured to store an ordered priority sequence of the plurality of first DC outputs, and when the grid AC power signal is not available, cause the controller to disable and enable the plurality of first load controllers based upon the ordered priority sequence of the plurality of first DC outputs. In some embodiments, the DC UPS may further comprise at least one DC-DC converter coupled to the first switch and configured to convert the battery DC power signal or the first DC power signal to a second DC power signal. The second DC power signal may be different from the battery DC power signal and the first DC power signal. The DC UPS may comprise a plurality of second DC outputs coupled downstream from the at least one DC-DC converter and configured to provide the second DC power signal to a corresponding plurality of second loads, and a plurality of second load controllers each coupled between respective ones of the plurality of second DC outputs and the at least one DC-DC converter. The cloud application server may be configured to disable and enable the plurality of second load controllers.

The controller may be configured to monitor at least one networking characteristic, and disable and enable a given load controller based upon the at least one networking characteristic. The at least one networking characteristic may be associated with a communication link between the cloud application server and the DC UPS. The at least one networking characteristic may be associated with a local network entirely collocated with the DC UPS.

Moreover, the controller may be configured to disable and enable a given load controller periodically. The controller may be configured to periodically connect to the cloud application server to upload at least one system event and a present status. The cloud application server may be configured to send at least one message to a respective user of the DC UPS based upon the at least one system event and the present status.

The DC UPS may further comprise a communications port coupled to the controller and configured to establish a communications link with the cloud application server. The controller may be configured to periodically connect to the cloud application server to download at least one or more system or user commands. The controller may be configured to download a firmware update from the cloud application server.

Another aspect is directed to a method for operating a UPS system with a DC UPS comprising a battery power source configured to provide a battery DC power signal, an AC-DC converter configured to convert a grid AC power signal to a first DC power signal, and a first switch coupled downstream from the AC-DC converter. The DC UPS may include a second switch coupled between the first switch and the battery power source, a plurality of first DC outputs coupled to the first switch and configured to provide the battery DC power signal or the first DC power signal to a corresponding plurality of first loads, and a plurality of first load controllers each coupled between respective ones of the plurality of first DC outputs and the first switch. The method may include operating a controller coupled to the first and second switches and the plurality of first load controllers, and to switch between a first mode where the first DC power signal is supplied to the plurality of first load controllers, and a second mode where the battery DC power signal is supplied to the plurality of first load controllers, and operating a cloud application server in communication with the DC UPS and to cause the controller to disable and enable the plurality of first load controllers.

DETAILED DESCRIPTION

Figure 1A:
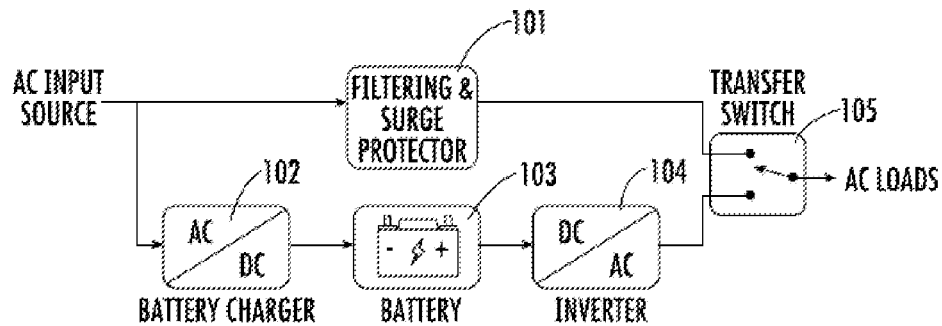
FIGS. 1A-1C are schematic block diagrams of UPS systems, according to the prior art.
Figure 1B:
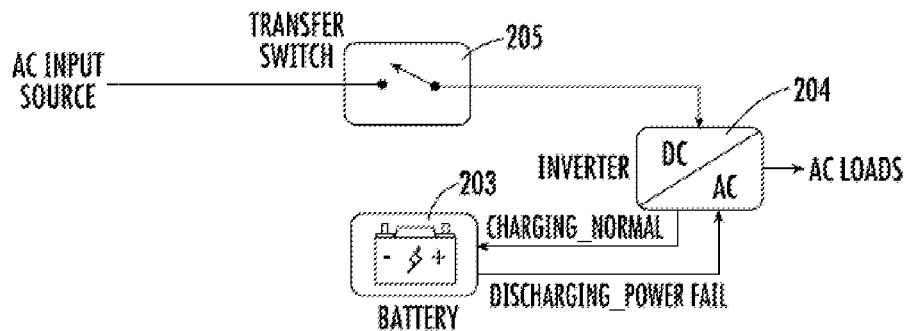
Figure 1C:
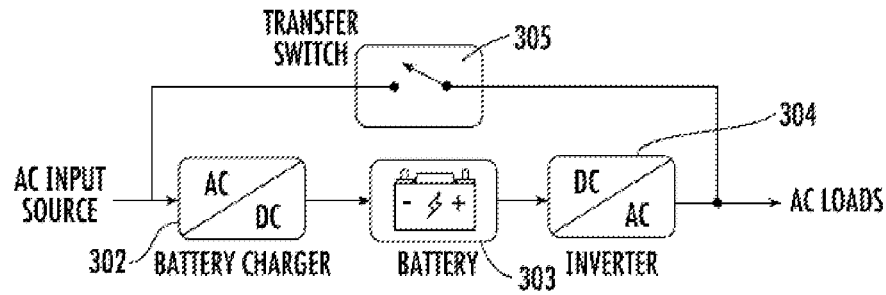

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, prime notation is used to indicate similar elements in alternative embodiments, and base 100 reference numerals are used to indicate similar elements in alternative embodiments.

Many typical UPS systems provide AC backup power and have a single point of load. Yet, most IT equipment is DC in nature, and almost all use AC to DC adapters to provide low voltage DC power, typically 12V or 5V. As such, using an AC UPS system degrades overall efficiency because power will need to be converted from AC to DC for battery charging and then inverted to AC to power the load. AC to DC power adapters will then convert the AC power back to low voltage DC.

Another limitation of most UPS systems is that they are heavy and bulky, and they primarily use low energy density lead acid batteries. Due to their low energy density, the backup time with lead acid batteries tends to be short, namely minutes with most UPS systems. Due to the limitations of many existing AC UPS systems, further improvements may be desirable for a multiport DC UPS system.

Figure 3:
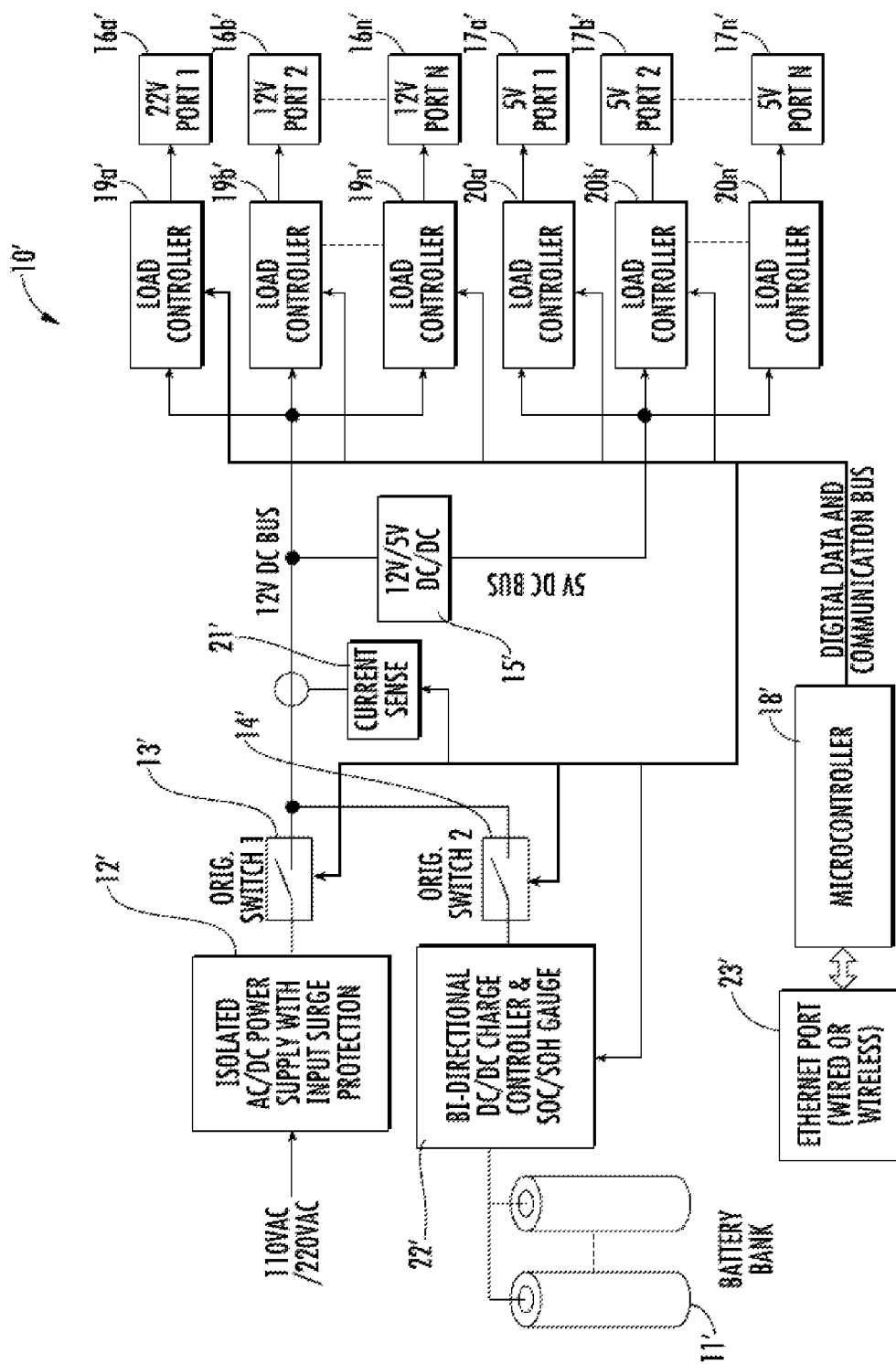
FIG. 3 a schematic block diagram of another embodiment of the DC UPS of FIG. 2.

Referring now to FIG. 3, this disclosure relates to a multiport DC UPS system. In accordance with an example embodiment of the present disclosure, the system may include an AC to DC power supply with input and surge protection that converts the incoming single phase AC input voltage into a low voltage DC output voltage, a bidirectional DC/DC battery charger and controller with battery state of charge (SOC), and battery state of health (SOH) gauges, a low voltage DC battery bank for energy storage, a low voltage DC distribution bus, multiple DC output ports with load controllers, a microprocessor or microcontroller, and a digital data and control bus for interfacing with various elements of the system.

The multiport DC UPS system may also include transfer switches (Oring Switches) for switching between the input power supply and the battery bank. When AC power is fails, the Oring switch connected to the input power supply is turned off while the Oring switch connected to the battery bank is turned on. By way of example, the low voltage DC distribution bus may be 12V, which is compatible with many IT devices, such as cable modems and routers.

The multiport DC UPS system may further include a DC/DC converter for converting the low voltage DC bus voltage up or down to meet the need of other low voltage IT devices. By way of example, a 12V to 5V step down DC/DC converter may be used to generate a low voltage 5V DC distribution bus along with multiple 5V DC output ports with load controllers.

The multiport DC UPS system may further include current sense circuitry for sensing the total current supplied to the load by the power supply or by the battery when the input power fails. The microprocessor controller may control the operation of the entire multiport DC UPS system. The microprocessor controls the Oring switches states based on the availability of input power, enables or disables the load controllers, reads the total current supplied to the multiple connected ports, and reads the battery SOC and SOH. The multiport DC UPS system may further include an Ethernet connection (e.g. power over Ethernet), which can be wired or wireless, to connect to the Internet and provide various information about the state of the system as well as various alerts.

The microprocessor controller may also set the priority of the multiple ports based on a preset order. By way of example, one can program the priority order of the ports in a sequential manner where the output 12V port 1 is the most important or most critical load followed by port 2 and so on. During battery backup operation when the input power fails, the microprocessor can first allow all loads to continue to be supported. As the state of charge of the battery declines, the microprocessor can turn off the least critical load controller first, then the next least critical load controller allowing more backup time for the most critical loads. The sequence of the priority of the output ports may be programmed with a dedicated software application connected through the Ethernet port.

The microprocessor controls may also save various data, such as power fail events, duration of power fail, total load during power fail, start SOC at the beginning of the power fail, end SOC at the end of power fail, the total projected backup time if the input power fails, etc. This data may be downloaded using a dedicated software application connected through the Ethernet port.

In another embodiment of the disclosure, the multiport DC UPS system may include a cloud application, which can save various data about the status and health of the multiport DC UPS system. By way of example, the microprocessor can be programmed to connect to the cloud application at some regular intervals and upload the systems events and present status.

The microprocessor controls may also perform frequent battery testing to properly assess the battery SOC and SOH. By way of example, when the power input is still available, the microprocessor may intentionally turn off the AC to DC power supply Oring switch and turn on the battery backup power switch allowing the battery to supply the load for all the connected ports for a set period of time. This will allow the SOC and SOH gauges to be corrected, yielding a better estimate of the total projected backup time.

The microprocessor controller, as well as the cloud application, may also send alerts to users of power fail events. In addition, the microprocessor, as well as the cloud application, may send alerts of the need to change the battery when the battery reaches end of life.

Figure 2:
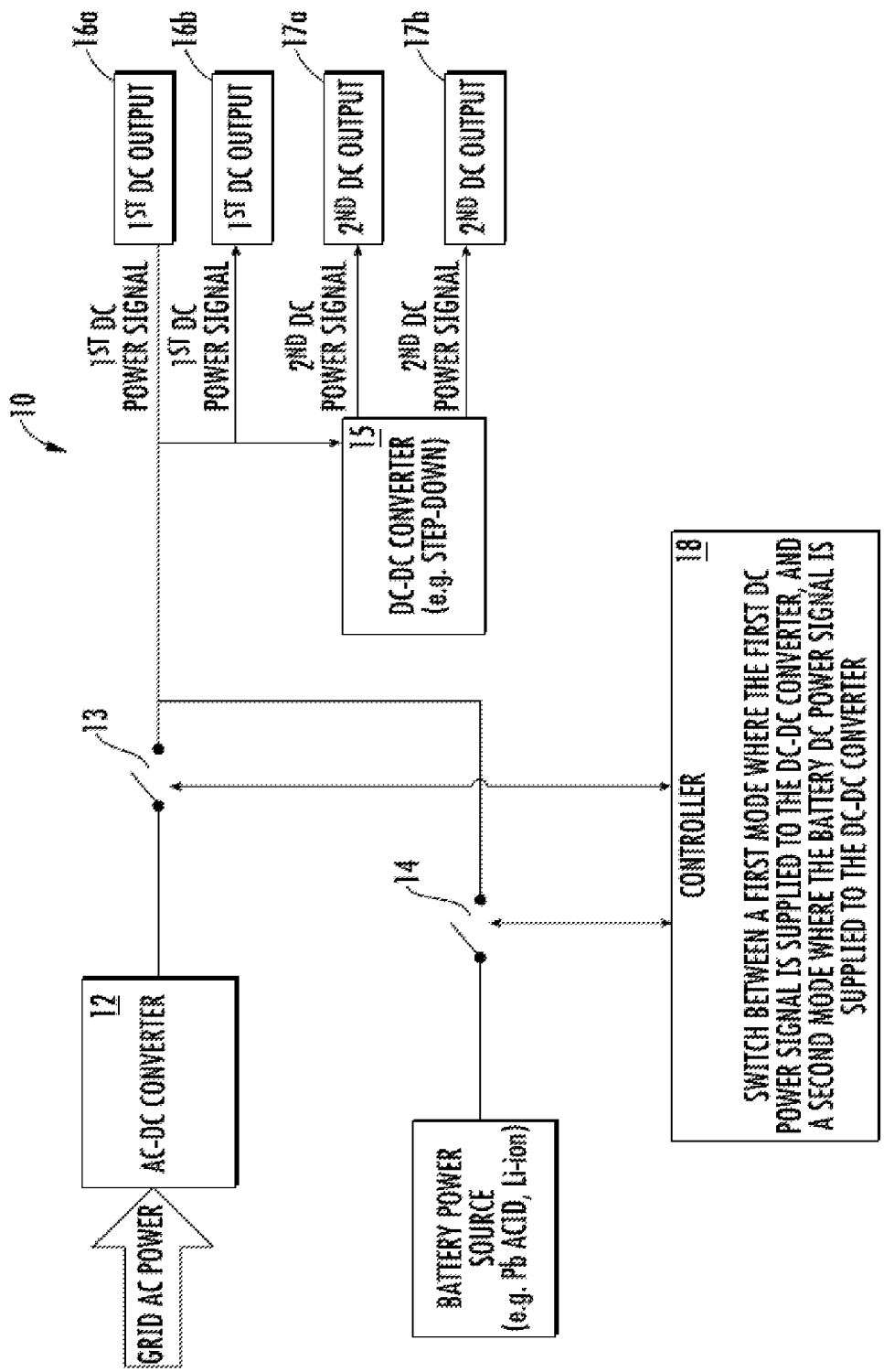
FIG. 2 is a schematic block diagram of a DC UPS, according to the present disclosure.

Referring now to FIG. 2, a DC UPS 10 according to the present disclosure is now described. The DC UPS 10 illustratively includes a battery power source 11 (e.g. lead acid, Li-ion batteries) configured to provide a battery DC power signal (e.g. 4-50 Volts), an AC-DC converter 12 configured to convert a grid AC power signal to a first DC power signal (e.g. 4-50 Volts), and a first switch 13 coupled downstream from the AC-DC converter.

The DC UPS 10 illustratively includes a second switch 14 coupled between the first switch 13 and the battery power source 11, and a DC-DC converter 15 coupled to the first switch and configured to convert the first DC power signal or the battery DC power signal (i.e. a selected/desired one of the battery DC power signal and the first DC power signal) to a second DC power signal (e.g. 4-30 Volts). Each of the first and second switches 13, 14 illustratively includes a single-pole, single-throw (SPST) switch.

The second DC power signal is different from the first DC power signal and the battery DC power signal. More specifically, the battery DC power signal and the first DC power signal may have a greater voltage than the second DC power signal. Also, the first DC power signal and battery DC power signal are typically substantially (±20%) equal to the battery DC power signal. In this embodiment, the DC-DC converter 15 comprises a step down converter. Alternatively, the first DC power signal/battery DC power signal may have a voltage less than the second DC power signal. In this embodiment, the DC-DC converter 15 comprises a step up converter.

The DC UPS 10 illustratively includes a plurality of first DC outputs 16a-16b coupled to the first switch 13 and configured to provide the battery DC power signal or the first DC power signal to a corresponding plurality of first loads. The DC UPS 10 illustratively includes a plurality of second DC outputs 17a-17b coupled downstream from the DC-DC converter 15 and configured to provide the second DC power signal to a corresponding plurality of second loads. As will be appreciated, each load of the pluralities of first and second loads comprises a DC powered device (e.g. computing devices, printers, peripheral devices, networking equipment). In some embodiments, the DC UPS 10 may comprise a plurality of DC-DC converters (FIG. 4), and the first DC outputs 16a-16b may be coupled to the first switch 13 via one of the plurality of DC-DC converters.

The DC UPS 10 illustratively includes a controller 18 coupled to the first and second switches 13-14 and configured to switch between a first mode where the first DC power signal is supplied to the DC-DC converter 15, and a second mode where the battery DC power signal is supplied to the DC-DC converter. In the first mode, the first switch 13 is closed, and the second switch 14 is open. In the second mode, the first switch 13 is open, and the second switch 14 is closed. Also, the controller is configured to switch into a third mode (i.e. a fault mode) where the first switch 13 is open, and the second switch 14 is open, thereby isolating the pluralities of first and second loads from all power sources.

Another aspect is directed to a method of making a DC UPS 10. The method includes providing a battery power source 11 to provide a battery DC power signal, coupling an AC-DC converter 12 to convert a grid AC power signal to a first DC power signal, coupling a first switch 13 downstream from the AC-DC converter, and coupling a second switch 14 between the first switch and the battery power source. The method comprises coupling a DC-DC converter 15 to the first switch 13 and to convert the battery DC power signal or the first DC power signal to a second DC power signal, the second DC power signal being different from the battery DC power signal and the first DC power signal, and coupling a plurality of first DC outputs 16a-16b to the first switch and to provide the battery DC power signal or the first DC power signal to a corresponding plurality of first loads. The method comprises coupling a plurality of second DC outputs 17a-17b downstream from the DC-DC converter 15 and to provide the second DC power signal to a corresponding plurality of second loads, and coupling a controller 18 to the first and second switches 13, 14 and to switch between a first mode where the first DC power signal is supplied to the DC-DC converter, and a second mode where the battery DC power signal is supplied to the DC-DC converter.

Referring now additionally to FIG. 3, another embodiment of the DC UPS 10' is now described. In this embodiment of the DC UPS 10', those elements already discussed above with respect to FIG. 2 are given prime notation and most require no further discussion herein. This embodiment differs from the previous embodiment in that this DC UPS 10' has a plurality of first load controllers 19a'-19n' each coupled between respective ones of the plurality of first DC outputs 16a'-16n' and the first switch 13', each first load controller being coupled to the controller 18'.

The DC UPS 10' illustratively includes a plurality of second load controllers 20a'-20n' each coupled between respective ones of the plurality of second DC outputs 17a'-17n' and the DC-DC converter 15', each second load controller being coupled to the controller 18'. Each load controller of the plurality of first load controllers 19a'-19n' and the plurality of second load controllers 20a'-20n' is configured to island/isolate a respective load based upon the command of the controller 18', monitor a respective current passing therethrough, and monitor a respective voltage being output. For example, based upon the aforementioned prioritization feature, the controller 18' is configured to manage the plurality of first load controllers 19a'-19n' and the plurality of second load controllers 20a'-20n' to ration power in the second mode, and isolate a respective load if current or voltage are out of normal range (e.g. under voltage, overcurrent).

The DC UPS 10' illustratively includes an current sense circuit 21' (e.g. ammeter circuit) coupled to the controller 18' and configured to sense a cumulative current passing through the plurality of first DC outputs 16a'-16n' and the plurality of second DC outputs 17a'-17n'. The AC-DC converter 12' also illustratively is configured to detect and suppress power surges in the grid AC power signal.

The DC UPS 10' illustratively includes a bidirectional charge controller and battery monitoring circuit 22' coupled to the controller 18' and between the battery power source 11' and the second switch 14'. In particular, the bidirectional charge controller and battery monitoring circuit 22' illustratively includes a DC/DC charge controller configured to provide performance characteristics on the battery power source 11'. The performance characteristics may comprise battery voltage (e.g. for individual batteries in bank embodiments), battery temperature, and estimated time to battery depletion. Additionally, in this embodiment, the battery power source 11' illustratively includes a plurality of batteries arranged in a bank.

The DC UPS 10' illustratively includes a communications port 23' (e.g. Ethernet controller, universal serial bus (USB), wireless local area network (WLAN) controller, or a wireless cellular controller) coupled to the controller 18'. The communications port 23' is configured to provide a management interface for monitoring the status of the DC UPS 10'. The management interface may be coupled to a cloud computing platform, or simply provide a secure accessible web interface.

Also, in this embodiment, the DC UPS 10' illustratively includes a data communications bus coupling the controller 18' to the first and second switches 13', 14'. The data communications bus also provides a connection to the plurality of first load controllers 19a'-19n', the plurality of second load controllers 20a'-20n', and the bidirectional charge controller and battery monitoring circuit 22'.

In the illustrative embodiment, the battery DC power signal and the first DC power signal each comprises 12 Volts. The second DC power signal comprises 5 Volts. Of course, these values are exemplary and can vary.

Figure 4:
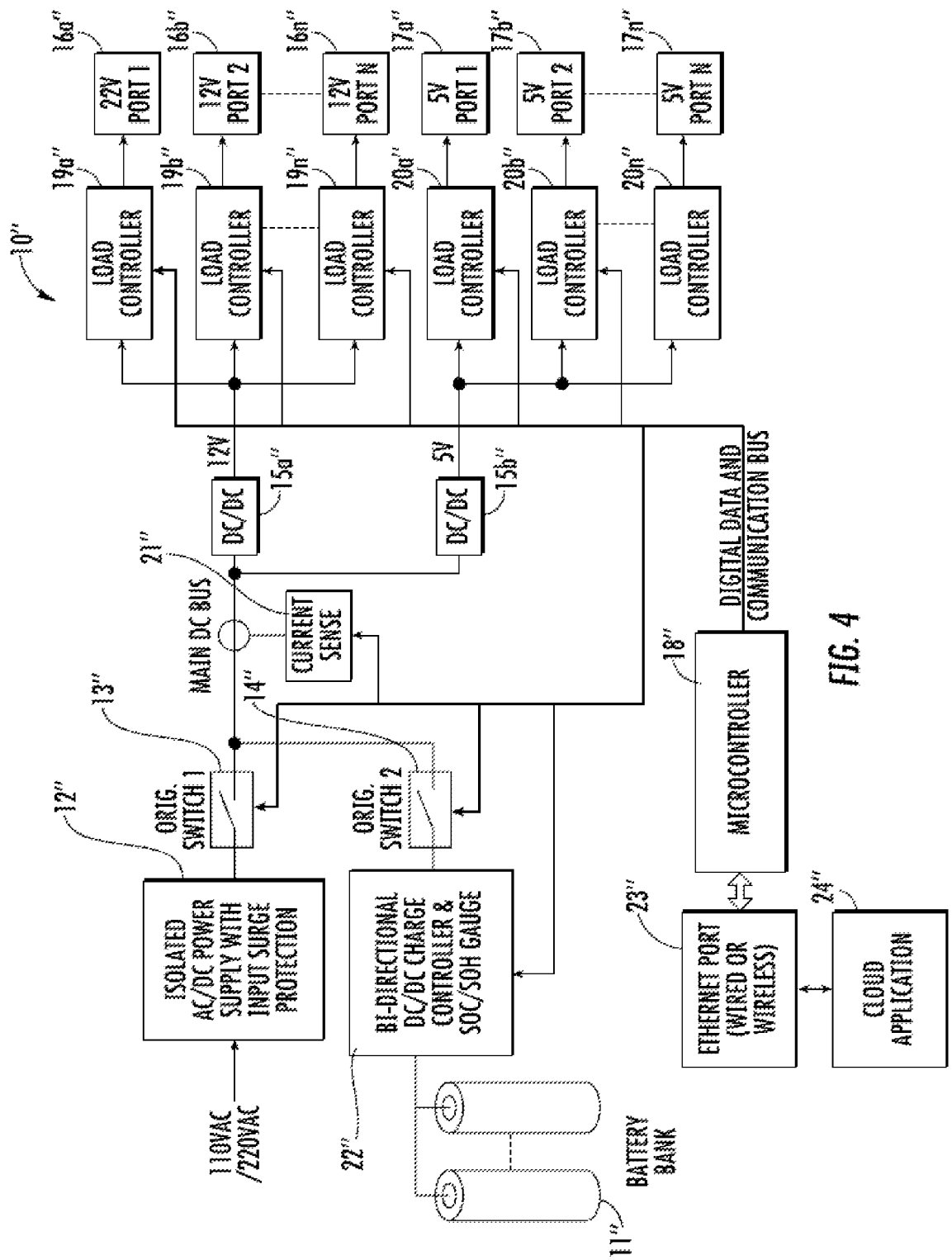
FIG. 4 a schematic block diagram of another embodiment of the DC UPS of FIG. 2.

Referring now additionally to FIG. 4, another embodiment of the DC UPS 10" is now described. In this embodiment of the DC UPS 10", those elements already discussed above with respect to FIGS. 2-3 are given double prime notation and most require no further discussion herein. This embodiment differs from the previous embodiment in that this DC UPS 10" includes a plurality of DC-DC converters 15a"-15b". In this embodiment, the first DC outputs 16a"-16n" are coupled to the first switch 13" via the first DC-DC converter 15a". The DC UPS 10" includes a cloud application server 24" configured to remotely control and configure the DC UPS. The controller 18" is configured to connect to the cloud application server 24" at some regular intervals and upload systems events and a present status.

Figure 5:
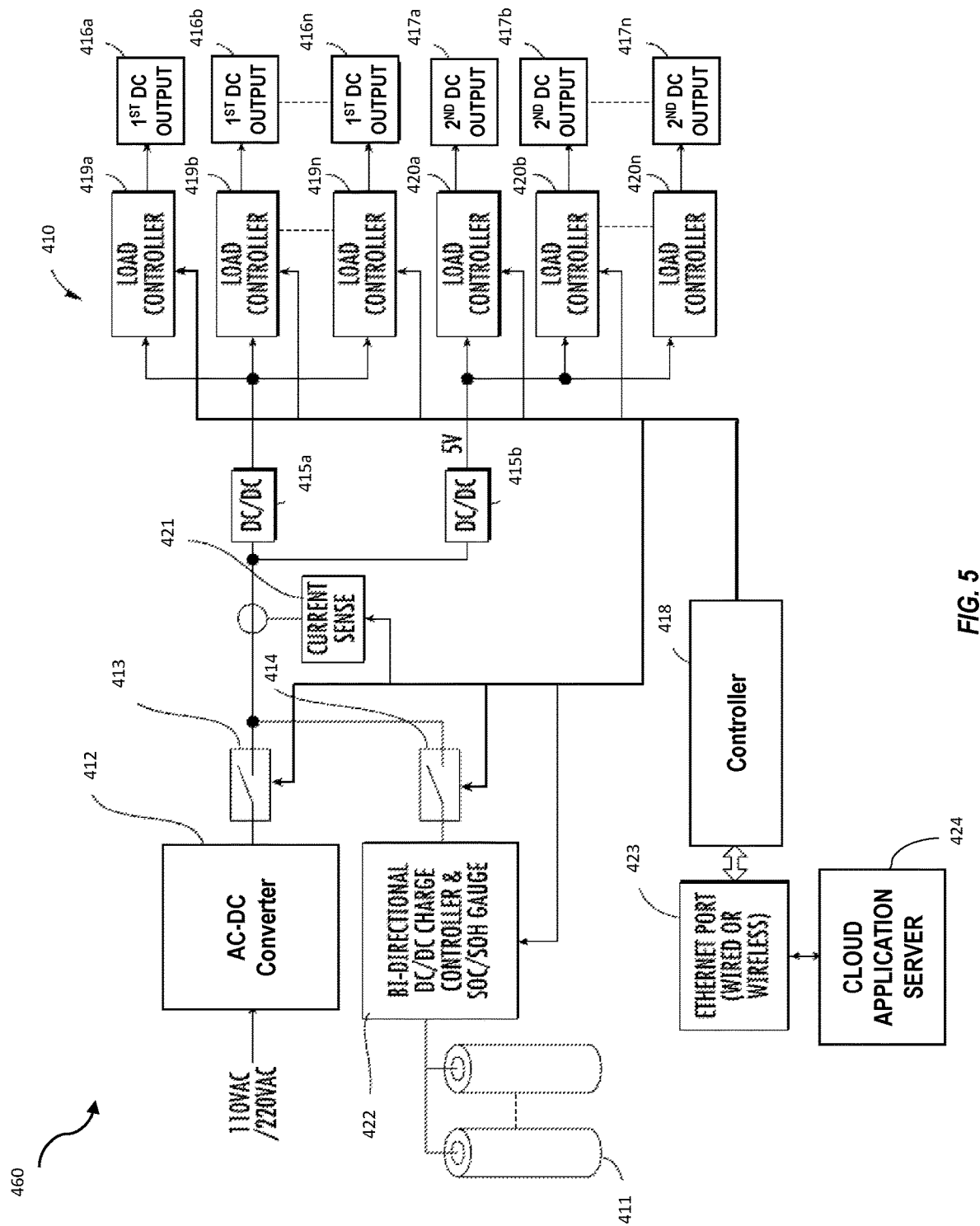
FIG. 5 a schematic block diagram of yet another embodiment of the DC UPS of FIG. 2.

Referring now additionally to FIG. 5, a UPS system 460 according to the present disclosure is now described. In this embodiment of the UPS system 460, those elements already discussed above with respect to the DC UPS 10, 10', 10" of FIGS. 1-4 are incremented by 400 and most require no further discussion herein. The UPS system 460 illustratively includes a DC UPS 410. The DC UPS 410 comprises a battery power source 411 configured to provide a battery DC power signal, an AC-DC converter 412 configured to convert a grid AC power signal to a first DC power signal, and a first switch 413 coupled downstream from the AC-DC converter. The DC UPS 410 includes a second switch 414 coupled between the first switch 413 and the battery power source 411, and a plurality of first DC outputs 416a-416n coupled to the first switch and configured to provide the battery DC power signal or the first DC power signal to a corresponding plurality of first loads.

The DC UPS 410 comprises a plurality of first load controllers 419a-419n, each coupled between respective ones of the plurality of first DC outputs 416a-416n and the first switch 413. The DC UPS 410 comprises a controller 418 coupled to the first and second switches 413, 414, and the plurality of first load controllers 419a-419n.

The controller 418 is configured to switch between a first mode where the first DC power signal is supplied to the plurality of first load controllers 419a-419n, and a second mode, when the grid AC power signal is not available, where the battery DC power signal is supplied to the plurality of first load controllers. The UPS system 460 includes a cloud application server 424 in communication with the DC UPS 410 and configured to cause the controller 418 to disable and enable the plurality of first load controllers 419a-419n. The cloud application server 424 is also configured to also cause the controller 418 to disable and enable the plurality of second load controllers 420a-420n.

In particular, the cloud application server 424 is configured to store an ordered priority sequence of the plurality of first DC outputs 416a-416n, and when the grid AC power signal is not available, cause the controller 418 to disable and enable the plurality of first load controllers based upon the ordered priority sequence of the plurality of first DC outputs. For example, the ordered priority sequence may place non-critical devices lower in the priority sequence, and place critical devices (e.g. router, networking devices, modem) higher in the priority sequence.

In the illustrated embodiment, the DC UPS 410 further comprises first and second DC-DC converters 415a-415b coupled to the first switch 413 and configured to convert the battery DC power signal or the first DC power signal to a second DC power signal. The second DC power signal (e.g. 5 Volts) is different from the battery DC power signal and the first DC power signal (e.g. 12 Volts).

The DC UPS 410 comprises a plurality of second DC outputs 417a-417n coupled downstream from the second DC-DC converter 415b. The plurality of second DC outputs 417a-417n is configured to provide the second DC power signal to a corresponding plurality of second loads. The DC UPS 410 includes a plurality of second load controllers 420a-420n, each coupled between respective ones of the plurality of second DC outputs and the second DC-DC converter 415b.

The controller 418 is configured to monitor a plurality of networking characteristics, and disable and enable a given load controller 419a-419n, 420a-420n based upon the plurality of networking characteristics. The plurality of networking characteristics (e.g. packet loss percentage, latency, quality of service metrics) may be associated with a communication link between the cloud application server 424 and the DC UPS 410, and/or be associated with a local network entirely collocated with the DC UPS 410. For example, if the plurality of networking characteristics indicates the communication link between the cloud application server 424 and the DC UPS 410 is poor, the controller 418 is configured to power cycle the given load controller 419a-419n, 420a-420n associated with the communication link (i.e. modem, router, and networking switch). Also, if the plurality of networking characteristics indicates the local network performance is poor, the controller 418 is configured to power cycle the given load controller 419a-419n, 420a-420n associated with the local network (i.e. router and networking switch).

Moreover, the controller 418 is configured to disable and enable a given load controller 419a-419n, 420a-420n periodically (e.g. daily). For example, a given load controller 419a-419n, 420a-420n may be associated with a wireless access point, and the controller 418 may cause a power cycle or hard reset of the wireless access point. This may be helpful for any device that has degraded performance after a set run time.

The controller 418 is configured to periodically (e.g. hourly) connect to the cloud application server 424 to upload at least one system event and a present status. The cloud application server 424 is configured to send at least one message (e.g. email, short message service (SMS) message) to a respective user of the DC UPS 410 based upon the at least one system event and the present status.

The DC UPS 410 further comprises a communications port 423 coupled to the controller 418 and configured to establish a communications link with the cloud application server 424. The controller 418 is configured to periodically connect to the cloud application server 424 to download at least one or more system or user commands. The controller 418 is configured to download a firmware update from the cloud application server 424.

Another aspect is directed to a method for operating a UPS system 460 with a DC UPS 410 comprising a battery power source 411 configured to provide a battery DC power signal, an AC-DC converter 412 configured to convert a grid AC power signal to a first DC power signal, and a first switch 413 coupled downstream from the AC-DC converter. The DC UPS 410 includes a second switch 414 coupled between the first switch 413 and the battery power source 411, a plurality of first DC outputs 416a-416n coupled to the first switch and configured to provide the battery DC power signal or the first DC power signal to a corresponding plurality of first loads, and a plurality of first load controllers 419a-419n each coupled between respective ones of the plurality of first DC outputs and the first switch. The method includes operating a controller 418 coupled to the first and second switches 413, 414 and the plurality of first load controllers 419a-419n. The method includes operating the controller 418 to switch between a first mode where the first DC power signal is supplied to the plurality of first load controllers 419a-419n, and a second mode where the battery DC power signal is supplied to the plurality of first load controllers. The method further includes operating a cloud application server 424 in communication with the DC UPS 410 and to cause the controller 418 to disable and enable the plurality of first load controllers 419a-419n.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. An uninterruptible power supply (UPS) system comprising:
   a direct current (DC) UPS comprising
      a battery power source configured to provide a battery DC power signal,
      an alternating current to direct current (AC-DC) converter configured to convert a grid AC power signal to a first DC power signal,
      a first switch having a first terminal directly coupled downstream from said AC-DC converter and a second terminal,
      a second switch having a first terminal coupled to said battery power source and a second terminal directly coupled to said second terminal of said first switch,
      a plurality of first DC outputs coupled to said first switch and configured to provide the battery DC power signal or the first DC power signal to a corresponding plurality of first loads,
      a plurality of first load controllers each coupled between respective ones of said plurality of first DC outputs and said first switch, and
      a controller coupled to said first and second switches, and said plurality of first load controllers, said controller configured to switch between a first mode where the first DC power signal is supplied to said plurality of first load controllers, and a second mode where the battery DC power signal is supplied to said plurality of first load controllers; and
   a cloud application server in communication with said DC UPS and configured to cause said controller to disable and enable said plurality of first load controllers.

2. The UPS system of claim 1 wherein said cloud application server is configured to:
   store an ordered priority sequence of the plurality of first DC outputs; and
   when the grid AC power signal is not available, cause said controller to disable and enable said plurality of first load controllers based upon the ordered priority sequence of the plurality of first DC outputs.

3. The UPS system of claim 1 wherein said DC UPS further comprises:
   at least one DC-DC converter coupled to said first switch and configured to convert the battery DC power signal or the first DC power signal to a second DC power signal, the second DC power signal being different from the battery DC power signal and the first DC power signal;
   a plurality of second DC outputs coupled downstream from said at least one DC-DC converter and configured to provide the second DC power signal to a corresponding plurality of second loads; and
   a plurality of second load controllers each coupled between respective ones of said plurality of second DC outputs and said at least one DC-DC converter;
   wherein said cloud application server is configured to disable and enable said plurality of second load controllers.

4. The UPS system of claim 1 wherein said controller is configured to monitor at least one networking characteristic, and disable and enable a given load controller based upon the at least one networking characteristic.

5. The UPS system of claim 4 wherein the at least one networking characteristic is associated with a communication link between said cloud application server and said DC UPS.

6. The UPS system of claim 4 wherein the at least one networking characteristic is associated with a local network entirely collocated with said DC UPS.

7. The UPS system of claim 1 wherein said controller is configured to disable and enable a given load controller periodically.

8. The UPS system of claim 1 wherein said controller is configured to periodically connect to said cloud application server to upload at least one system event and a present status.

9. The UPS system of claim 8 wherein said cloud application server is configured to send at least one message to a respective user of said DC UPS based upon the at least one system event and the present status.

10. The UPS system of claim 1 wherein said DC UPS further comprises a communications port coupled to said controller and configured to establish a communications link with said cloud application server.

11. The UPS system of claim 1 wherein said controller is configured to periodically connect to said cloud application server to download at least one or more system or user commands.

12. The UPS system of claim 1 wherein said controller is configured to download a firmware update from said cloud application server.

13. An uninterruptible power supply (UPS) system comprising:
   a direct current (DC) UPS comprising
      a battery power source configured to provide a battery DC power signal,
      an alternating current to direct current (AC-DC) converter configured to convert a grid AC power signal to a first DC power signal,
      a first switch having a first terminal directly coupled downstream from said AC-DC converter and a second terminal,
      a second switch having a first terminal coupled to said battery power source and a second terminal directly coupled to said second terminal of said first switch,
      a plurality of first DC outputs coupled to said first switch and configured to provide the battery DC power signal or the first DC power signal to a corresponding plurality of first loads,
      a plurality of first load controllers each coupled between respective ones of said plurality of first DC outputs and said first switch, and
      a controller coupled to said first and second switches, and said plurality of first load controllers, said controller configured to
         switch between a first mode where the first DC power signal is supplied to said plurality of first load controllers, and a second mode where the battery DC power signal is supplied to said plurality of first load controllers,
         monitor at least one networking characteristic, and disable and enable a given load controller based upon the at least one networking characteristic; and
   a cloud application server in communication with said DC UPS and configured to
      cause said controller to disable and enable said plurality of first load controllers,
      store an ordered priority sequence of the plurality of first DC outputs, and
      when the grid AC power signal is not available, cause said controller to disable and enable said plurality of first load controllers based upon the ordered priority sequence of the plurality of first DC outputs.

14. The UPS system of claim 13 wherein said DC UPS further comprises:
   at least one DC-DC converter coupled to said first switch and configured to convert the battery DC power signal or the first DC power signal to a second DC power signal, the second DC power signal being different from the battery DC power signal and the first DC power signal;
   a plurality of second DC outputs coupled downstream from said at least one DC-DC converter and configured to provide the second DC power signal to a corresponding plurality of second loads; and
   a plurality of second load controllers each coupled between respective ones of said plurality of second DC outputs and said at least one DC-DC converter;
   wherein said cloud application server is configured to disable and enable said plurality of second load controllers.

15. The UPS system of claim 13 wherein the at least one networking characteristic is associated with a communication link between said cloud application server and said DC UPS.

16. The UPS system of claim 13 wherein the at least one networking characteristic is associated with a local network entirely collocated with said DC UPS.

17. The UPS system of claim 13 wherein said controller is configured to disable and enable a given load controller periodically.

18. A method for operating an uninterruptible power supply (UPS) system with a direct current (DC) UPS comprising a battery power source configured to provide a battery DC power signal, an alternating current to direct current (AC-DC) converter configured to convert a grid AC power signal to a first DC power signal, a first switch having a first terminal directly coupled downstream from the AC-DC converter and a second terminal, a second switch having a first terminal coupled to the battery power source and a second terminal directly coupled to the second terminal of the first switch, a plurality of first DC outputs coupled to the first switch and configured to provide the battery DC power signal or the first DC power signal to a corresponding plurality of first loads, and a plurality of first load controllers each coupled between respective ones of the plurality of first DC outputs and the first switch, the method comprising:
   operating a controller coupled to the first and second switches and the plurality of first load controllers, and to switch between
      a first mode where the first DC power signal is supplied to the plurality of first load controllers, and
      a second mode where the battery DC power signal is supplied to the plurality of first load controllers; and
   operating a cloud application server in communication with the DC UPS and to cause the controller to disable and enable the plurality of first load controllers.

19. The method of claim 18 further comprising operating the cloud application server to:
   store an ordered priority sequence of the plurality of first DC outputs; and
   when the grid AC power signal is not available, cause the controller to disable and enable the plurality of first load controllers based upon the ordered priority sequence of the plurality of first DC outputs.

20. The method of claim 18 further comprising operating the controller to monitor at least one networking characteristic, and disable and enable a given load controller based upon the at least one networking characteristic.

* * * * *